(No Model.)  
2 Sheets—Sheet 1.
J. HARTNESS.
SCREW MACHINE.
No. 510,020.  
Patented Dec. 5, 1893.
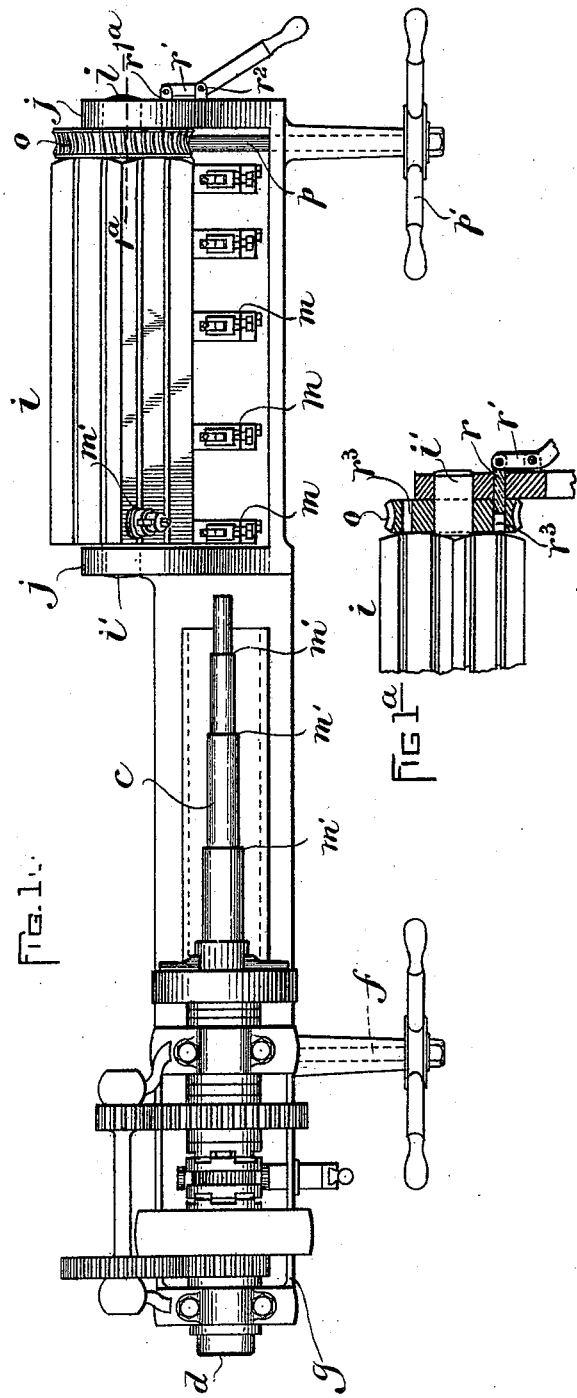
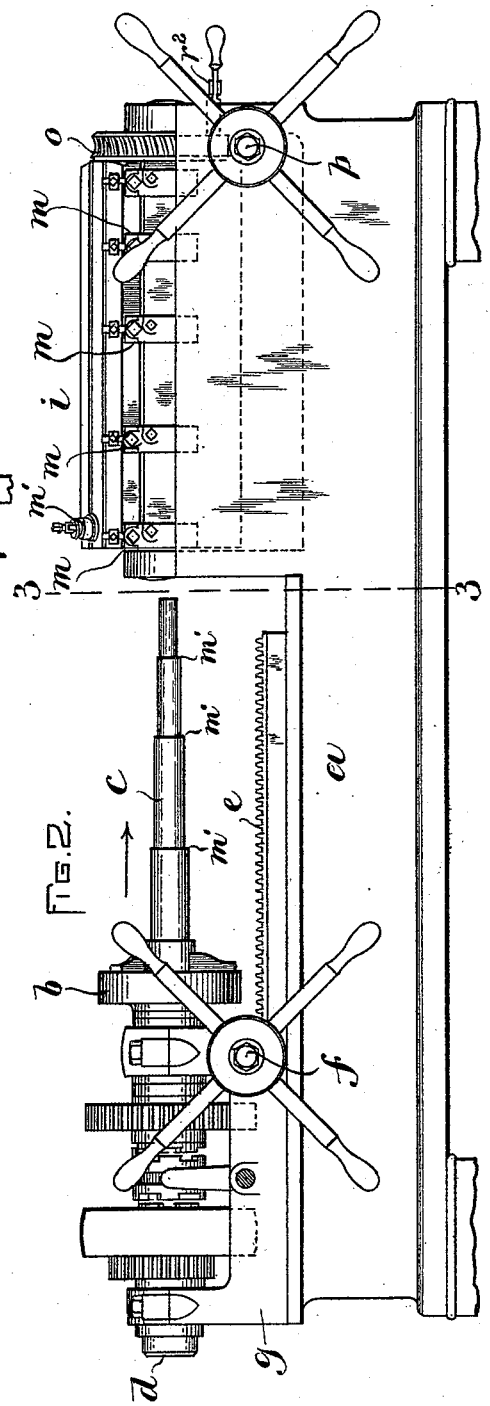
WITNESSES:  
Katharine C. Brown  
A. D. Harrison
INVENTOR:  
James Hartness  
by Wright Brown Crossley  
Attys.

(No Model.) 2 Sheets—Sheet 2.

J. HARTNESS.
SCREW MACHINE.

No. 510,020. Patented Dec. 5, 1893.

UNITED STATES PATENT OFFICE.

JAMES HARTNESS, OF SPRINGFIELD, VERMONT.

SCREW-MACHINE.

SPECIFICATION forming part of Letters Patent No. 510,020, dated December 5, 1893.

Application filed November 19, 1892. Serial No. 452,605. (No model.)

*To all whom it may concern:*

Be it known that I, JAMES HARTNESS, of Springfield, in the county of Windsor and State of Vermont, have invented certain new and useful Improvements in Screw-Machines, of which the following is a specification.

This invention relates to lathes provided with mechanism for holding and rotating a piece of work in the form of an elongated metal rod or bar, and with a tool-holder adapted to hold one or more tools and present the same to the rotating piece of work. Machines organized as thus indicated are usually termed screw machines, although used for a variety of purposes besides cutting screw-threads and performing other operations incidental to the manufacture of screws or bolts.

Heretofore in a machine of this class when a series of tools were arranged in a row to act simultaneously on the piece of work, these tools were affixed to a projecting holder, one end of which was held in a turret, while the other end had no support. When it was desired to turn work of any great length, the outer end was so far from its support and the over-hang so great that good results could not be obtained except at a sacrifice of time.

The object of my invention is to enable the tool-holder to present a line or row of tools simultaneously to the work in such a way that each end of the tool-holder is well supported, so that a plurality of tools may be cutting on the same piece of work at the same time, and that this piece of work can be of any length without affecting the stiffness of the tool-holder.

To this end, the invention consists in the construction and combination of parts as hereinafter described and claimed.

Figure 3:
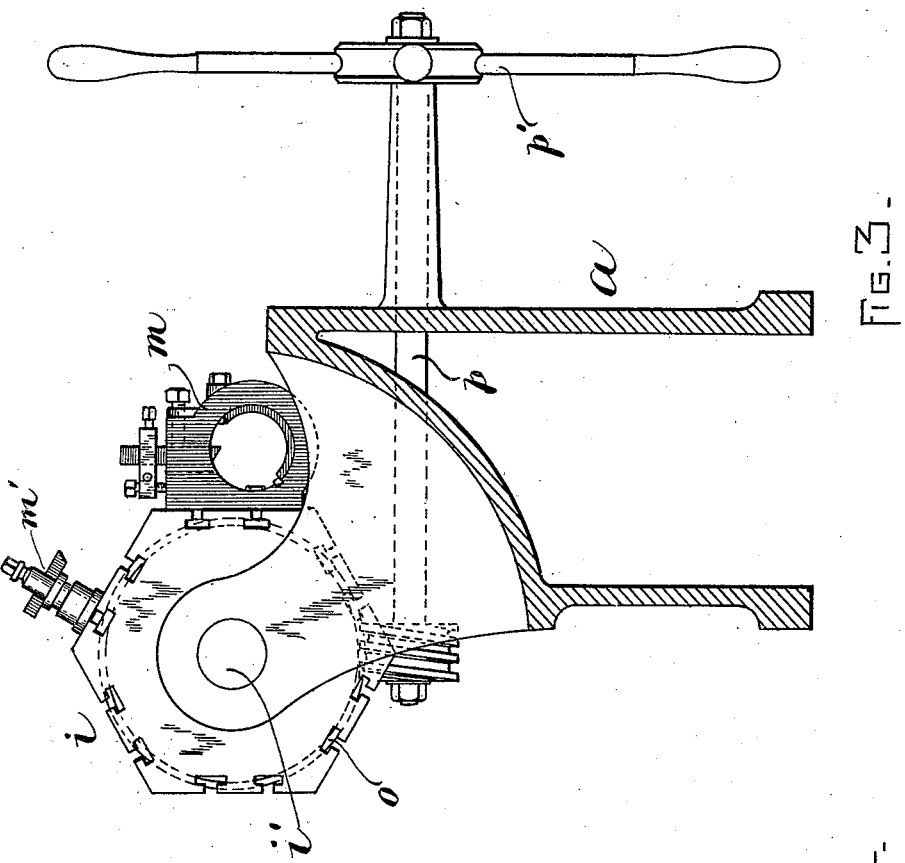
Figure 4:
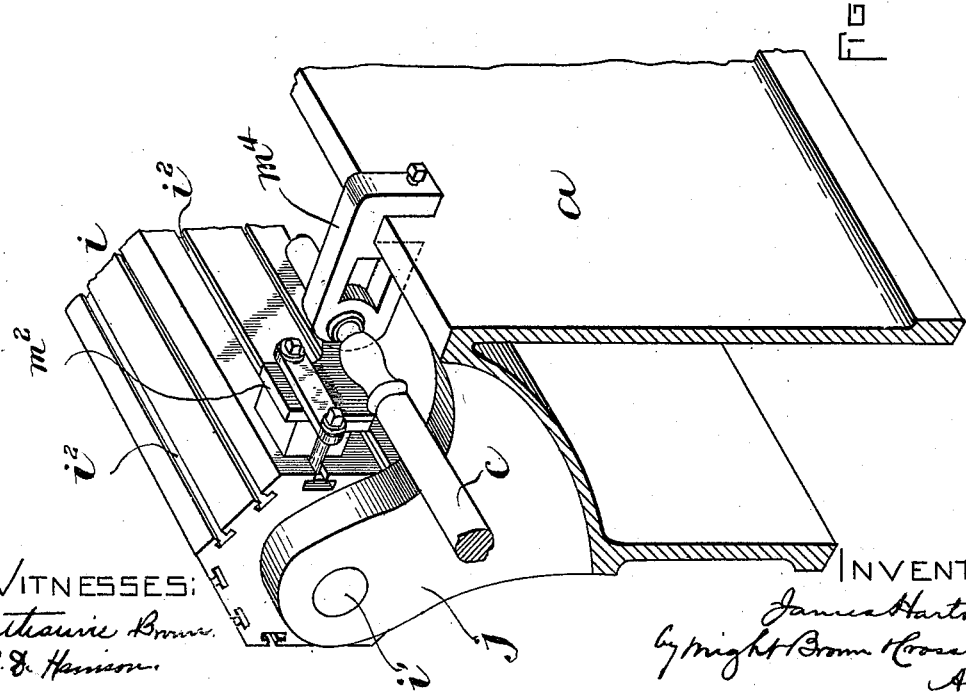

Of the accompanying drawings, forming part of this specification: Figure 1 represents a top view of a lathe or screw machine embodying my improvements. Fig. 1$^a$ represents a section on line 1$^a$—1$^a$, Fig. 1. Fig. 2 represents a side elevation of the same. Fig. 3 represents a section on line 3—3, Fig. 2, looking toward the right. Fig. 4 represents a perspective view showing a portion of the tool-holder and one of the bearings by which it is supported.

The same letters of reference indicate the same parts in all the figures.

In the drawings: $a$ represents the frame or bed of a lathe of the class above-mentioned, and $b$ represents a chuck adapted to hold and rotate an elongated rod or piece of work $c$, said chuck being suitably affixed to a spindle $d$, which may be rotated by any suitable means, the construction of the chuck and the means for rotating it forming no part of my present invention. In the present case, I have shown the chuck and spindle mounted upon a carriage, which is movable lengthwise of the lathe-bed, so that a feeding movement may be imparted to the work in the direction indicated by the arrow in Fig. 2, the means for imparting said movement, as here shown, being a rack $e$, affixed to the lathe-bed, and a pinion (not shown) affixed to a shaft $f$ journaled in bearings in the movable carriage $g$ which supports the spindle and chuck. My invention is not limited to this arrangement, however, and I show it simply for convenience. It will be understood that the spindle may be mounted in fixed bearings; and that the tool-holder hereinafter described may be adapted to move endwise to cause the tools to travel along the work, instead of causing the work to travel along the tools.

In carrying out my invention, I provide the machine with a tool-holder $i$, which is formed and arranged to hold a row or line of tools in a position substantially parallel with the axis of the work and at one side of the latter, so that all the tools of the row or line may be presented simultaneously to the work, thus enabling a number of tools to act simultaneously in performing the different operations required in producing elongated articles of various kinds.

The tool-holder $i$ is preferably mounted to rotate on an axis which is parallel with the axis of the work, so that the tool-holder may be moved to carry a tool or row of tools away from the work and present another tool or row of tools to the work, the rotating motion of the tool-holder being such that a tool carried by it will move in a plane at right angles to the axis of the work, so that, if desired, a tool held by the tool-holder may be given a progressive or feeding movement into the work, simply by the rotation of the tool-holder; that is to say, the cutting edge of the tool may be caused to travel toward the axis of the work, by imparting a rotary movement to the tool-holder.

In the construction shown in the drawings, the tool-holder is polygonal in form, and is provided at its ends with trunnions $i'\ i'$, which are journaled in bearings $j\ j$ supported by the frame of the machine, the tool-holder being here shown as hexagonal. Each of the faces of the tool-holder is substantially parallel with the axis of the work. The faces of the tool-holder are provided with longitudinal T-shaped grooves $i^2$, of the form usually employed on lathe-beds to engage with the bolt-heads which secure the operating tools to the carrier. Each of the faces is sufficiently elongated to hold a line or row of tools, as shown in Figs. 1 and 2, in which I have shown as the operating tools a line or row of hollow mills $m\ m\ m$, which may be of any desired construction, an end-view of the construction here illustrated being shown in Fig. 3. The said row of tools may be constructed and arranged to form a series of shoulders $m'$ on the piece of work $c$, the work being rotated and moved longitudinally into and through the tools.

In Figs. 1 and 2, the work is shown after it has been acted on by the tools and withdrawn from them, but it will be understood that, at the beginning of the operation, when the end of the work starts into the first tool of the row, only one tool will be in operation; but, as the work advances from the first tool, it meets the second tool, and so on, until it has gone through to the last tool, there being as many tools as there are sizes on the piece of work, said tools being located so as to properly locate the shoulders on the work.

Means are provided for rotating the tool-holder, and for positively holding it at any position to which it may be rotated, said means, as here shown, being a worm gear $o$, affixed to the holder $i$, and a shaft $p$ journaled in bearings in the frame of the machine and provided with a worm meshing with the gear $o$. The shaft $p$ has a hand-wheel $p'$, by which it may be rotated. The locking device, as here shown, is a pin or bolt $r$, connected with one end of a lever $r'$, which is pivoted at $r^2$ to an ear on the supporting-frame, the bolt being movable through an orifice in one of the bearings $j$, so that it will be engaged with either of a series of holes $r^3$ (Fig. 1ª) in the gear $o$, there being as many of said holes as there are faces on the holder, so that each line or row of tools may be locked in its operative position.

It will be seen from the foregoing that each face of the holder may be provided with one or more tools, so that, after the work has been acted on by one tool or set of tools, another tool or set of tools may be presented to the work by a partial rotation of the holder $i$. And it will be understood that the plurality of tools may be adjusted along the elongated holder so as to vary the relative positions of the shoulders $m$ formed on the work $c$. In general practice, there will be but two series of tools required, such as a row of hollow mills $m$ on one face of the holder, and a cutting-off tool $m'$ on the adjoining face, as shown in Figs. 1, 2 and 3; or one face of the holder may be occupied by tools adapted to rough out the work, and the adjacent face by tools adapted to finish the work to size. Other faces of the holder may be occupied by other tools, one of which may be a forming tool $m^2$, such as that shown in Fig. 4, adapted to impart a curvilinear or other irregular shape to the work. When said forming tool is used, it may be fed into the work by imparting a rotary motion to the holder while the tool is in action, thus causing the tool to move into the work until the desired form has been imparted to the work. It will be seen, therefore, that, by mounting the tool-holder on an axis which is parallel with the axis of the work, I am enabled to utilize the rotary movement of the tool-holder in feeding the tool into the work, a result which could not be accomplished if the tool-holder were mounted on a vertical axis, as heretofore. When the forming tool $m^2$ is used, the outer end of the work may be supported by a holder $m^4$, clamped to the frame of the machine, as shown in Fig. 4.

It is obvious that many different kinds of tools may be applied to the tool-holder, and that the form and construction of the tool-holder may be variously modified, without departing from the spirit of my invention.

The advantages resulting from the employment of a line or row of tools arranged substantially parallel with the axis of the work may be obtained by the employment of a tool-holder which is fixed instead of being mounted to rotate, although, for most purposes, a tool-holder adapted to rotate will be employed.

The tool-holder may be cylindrical, if desired, instead of polygonal, or it may be of any other suitable shape.

The bearings, $j$, afford rigid supports for each end of the elongated holder, so that the stiffness of the holder is maintained during the action of the tools upon the work and work of great length may be turned with accuracy.

Obviously, if the tool holder were supported at one end only, it would be impossible to support the plurality of tools so that they could operate simultaneously upon the work, owing to the heavy pressure necessary, which pressure would tend to force the tool holder out of alignment with the axis of the work.

I claim—

1. In a lathe, the combination with means for holding and rotating the work, of an elongated tool-holder, supported at both ends and mounted to rotate on an axis parallel with the axis of the work, and a row of tools adjustably secured to said holder, whereby the tools may be presented simultaneously to the work in preferred relative positions, as set forth.

2. In a lathe, the combination with means for holding and rotating the work, of an elongated tool-holder mounted to rotate in bearings at each end thereof, the said bearings being in a line parallel with the axis of the work, and a plurality of tools adjustably secured to said holder in a line parallel with the axis of the work, whereby the tools may be properly supported and simultaneously presented to the work, as set forth.

3. In a lathe having means for holding and rotating a piece of work, a tool-holder supported at both ends and mounted to rotate on an axis which is substantially parallel with the axis of the work, combined with a plurality of tools in each of a plurality of rows or lines, each of which is at all times parallel with the axis of the work, means for rotating said holder to present the different rows or lines of tools successively to the work, and means for positively securing the holder in different positions, as set forth.

In testimony whereof I have signed my name to this specification, in the presence of two subscribing witnesses, this 15th day of November, A. D. 1892.

JAMES HARTNESS.

Witnesses:
E. A. HILLS,
W. D. WOOLSON.